(12) United States Patent
Fogacci

(10) Patent No.: US 11,154,155 B2
(45) Date of Patent: Oct. 26, 2021

(54) PERFORATED VALVE FOR PRESSURE CONTAINER

(71) Applicant: FOGACCI GROUP S.r.l., Osteria Grande (IT)

(72) Inventor: Giosuè Fogacci, Osteria Grande (IT)

(73) Assignee: FOGACCI GROUP S.r.l., Osteria Grande (IT)

( * ) Notice: Subject to any disclaimer, the term of this patent is extended or adjusted under 35 U.S.C. 154(b) by 0 days.

(21) Appl. No.: 16/475,096

(22) PCT Filed: Dec. 11, 2017

(86) PCT No.: PCT/IB2017/057786
§ 371 (c)(1),
(2) Date: Jul. 1, 2019

(87) PCT Pub. No.: WO2018/122652
PCT Pub. Date: Jul. 5, 2018

(65) Prior Publication Data
US 2019/0328169 A1    Oct. 31, 2019

(51) Int. Cl.
*A47J 27/09* (2006.01)
*A47J 27/08* (2006.01)
*F16K 17/14* (2006.01)

(52) U.S. Cl.
CPC ........... *A47J 27/09* (2013.01); *A47J 27/0802* (2013.01); *F16K 17/14* (2013.01)

(58) Field of Classification Search
CPC ........ A47J 27/09; A47J 27/0802; F16K 17/14
See application file for complete search history.

(56) References Cited

U.S. PATENT DOCUMENTS

| | | | | |
|---|---|---|---|---|
| 2,463,516 A * | 3/1949 | Burkhardt | ............... | A47J 27/09 137/524 |
| 2,540,583 A * | 2/1951 | Ives | ........................ | A47J 27/09 137/534 |
| 2,563,563 A * | 8/1951 | Swenson | ................. | A47J 27/09 137/493 |
| 2,667,891 A * | 2/1954 | Hilldale | ............... | A47J 27/0802 137/470 |
| 4,799,508 A * | 1/1989 | Cuminale | ............... | A47J 27/09 137/534 |
| 5,178,500 A * | 1/1993 | Stencel | ................... | F16B 39/34 29/456 |
| 2013/0199635 A1* | 8/2013 | Hasegawa | ............... | A47J 27/09 137/535 |

FOREIGN PATENT DOCUMENTS

| | | |
|---|---|---|
| DE | 1815786 A1 | 11/1969 |
| EP | 0008465 A2 | 3/1980 |
| EP | 2606775 A1 | 6/2013 |
| WO | 2009/005182 A1 | 1/2009 |

OTHER PUBLICATIONS

ISR; European Patent Officel NL; dated Mar. 2, 2018.

* cited by examiner

*Primary Examiner* — Jessica Cahill
*Assistant Examiner* — Patrick C Williams
(74) *Attorney, Agent, or Firm* — Patshegen IP LLC; Moshe Pinchas

(57) ABSTRACT

Valve (V) for a pressure vessel comprises a hollow cylindrical valve cover element (1) adapted to define an outer cover for a hollow body (2) adapted to be disposed, in use, to the inside of the element (1) itself in the hollow part (C) of the said element (1); and a pawl (3) adapted to be inserted and housed, in use, inside said hollow body (2).

6 Claims, 1 Drawing Sheet

PERFORATED VALVE FOR PRESSURE CONTAINER

The present invention relates to an improved valve for a pressure vessel.

In particular, the invention according to the invention is advantageously used for controlling the steam inside a pressure vessel for cooking food and food in general, the following description will make explicit reference without losing in general, in particular to Indirect steam with self-control of the temperature, or in a container in which, between the heat source and the food to be cooked, an interspace is present in which water is present, or for an induction cooking or equivalent.

The object of the present invention is to provide a control valve for steam control which has an optimized structure, easy to keep clean and efficient, and which allows cooking of food at an optimum temperature. The optimum cooking temperature permitted with the use of the steam control valve in question is preferably but not limited to between 75° and 95° C.

The structural and functional characteristics of the present invention and its advantages will become clearer and more evident from the claims below, and in particular from an examination of the following description, referring to the attached figures, which show a preferred but not limitative embodiment of the valve in object, in which:

With reference to the attached FIGS. from 1 to 4, with V is globally indicated a steam control valve suitable for being applied and mounted on a container (known and not illustrated) for the pressure cooking of foods to foods in general, preferably but not limited to an optimal and effective cooking temperature between 75° and 95° Celsius.

The valve V comprises a brass hollow cylindrical valve cover element 1 or equivalent material for defining an outer cover for a valve body 2 adapted to be disposed, in use, inside the element 1 itself in the hollow part C of the element 1 same; the body 2 is in its turn provided with a hollow part C1, substantially shaped in a "bottle" section to house a pawl 3 inside it, in use.

Figure 1:
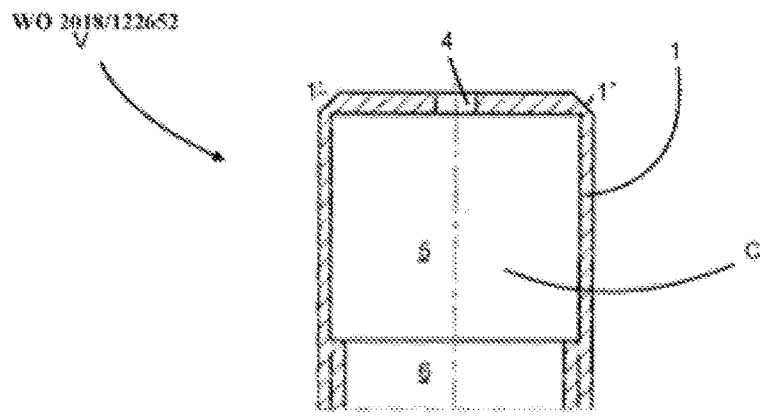
FIG. 1 shows a front sectional view and parts removed for clarity, a first constructive component of the valve in question.

As shown in FIG. 1, the valve cover element 1 is provided with bevelled upper outer edges 1 'and 1 "and a central through hole 4, and the inner cavity part C of the element 1 itself is defined by two surfaces 5 and 6 rectangular of different area and adjacent to each other and overlapped.

Figure 2:
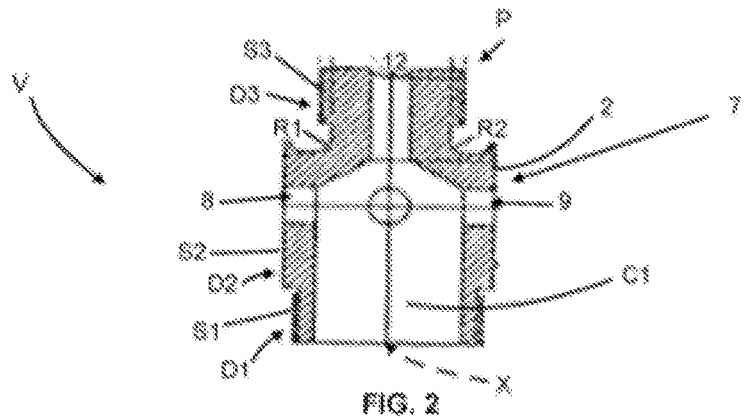
FIG. 2 shows in a front sectional view and parts removed for clarity, a second constructive component of the valve in question.
Figure 3:
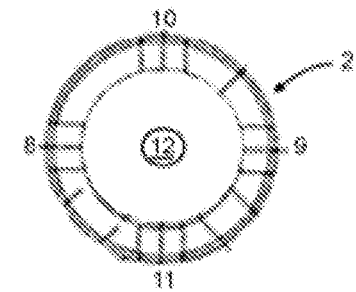
FIG. 3 shows in a plan view the component of FIG. 2; is
Figure 4:
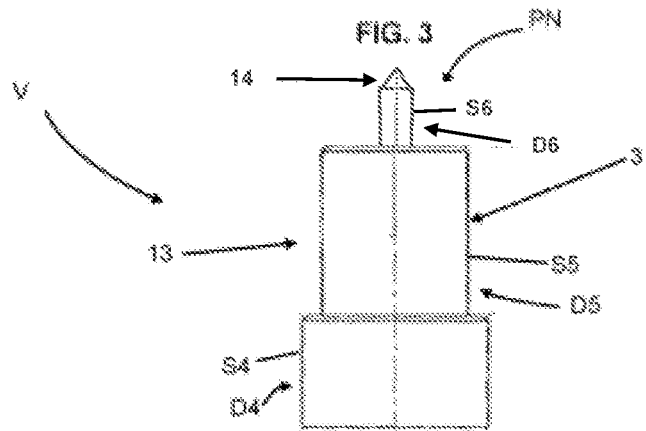
FIG. 4 is a front view of a third component of the construction of the valve according to the present invention.

According to what is illustrated in FIGS. 2 and 3, the hollow valve body 2 comprises an element 7, preferably made of brass or equivalent material, having a first lower cylindrical peripheral surface S1 with a given diameter D1, a second central cylindrical peripheral surface S2 with a determined diameter D2 greater than D1, and an upper portion P defined by its own cylindrical peripheral surface S3 with diameter D3 smaller than D1 and D2 and connected to the aforementioned central surface S2 by two curved connections R1 and R2 arranged on the opposite side of the central axis X longitudinal of the body 2 itself.

The surface S2 is also provided with four lateral holes 8, 9, 10, and 11 passing towards the hollow part C1 of the body 2, arranged on a band opposite to the central longitudinal axis X of the body 2 itself, and the portion P is provided a central hole 12 passing towards the hollow part C1.

According to what is illustrated in FIG. 3, the pawl 3 of the valve V in question comprises a solid element 13, preferably made of brass or equivalent material, having a first lower cylindrical peripheral surface S4 with a given diameter D4, a second central cylindrical peripheral surface S5 with a diameter determined D5 less than D4, and an upper portion PN defined by its own cylindrical peripheral surface S6 with diameter D6 smaller than D4 and D5 and a cusp 14 truncated cone, which is connected to the aforementioned upper surface S6 and is suitable for insertion into use, in the hole 4 of the element 1.

The invention claimed is:

1. A Valve for a pressure cooking vessel, comprising:
  a cover element having a hollow cylindrical sidewall defining an inner cavity and a top wall having a hole defined along a central longitudinal axis of said cover element;
  a valve housing adapted to be disposed inside said inner cavity of said cover element, said valve housing including a sidewall including a first outer surface having a first diameter and defining a valve cavity; said valve housing further includes an upper portion including a second outer surface having a second diameter and defining a conduit extending between said valve cavity and said hole of said cover element along said central longitudinal axis; and
  a valve element adapted to be inserted and housed inside said valve cavity of said valve housing, said valve element includes a truncated cone defined along said central longitudinal axis and configured to be inserted inside hole of said cover element when said valve element is disposed inside the valve cavity.

2. The Valve according to claim 1, wherein said cover element, said valve housing and said valve element are made of brass.

3. The valve according to claim 1, wherein said valve housing comprises an element having a first lower cylindrical peripheral surface with a given diameter, a second central cylindrical peripheral surface having the first diameter greater than said given diameter, said upper portion defined by its own cylindrical peripheral surface having the second diameter smaller than said given diameter and said first diameter, and said upper portion connected to said central surface by a fitting arranged around a central longitudinal axis of said valve housing.

4. The valve according to claim 3, wherein said central cylindrical peripheral surface is also further provided with four through holes; and said upper portion being is provided with a central through hole.

5. The valve according to claim 1, wherein said valve element comprises a solid element having a first lower cylindrical peripheral surface with a given diameter, a second central cylindrical peripheral surface having a third diameter less than said given diameter, an upper portion of said valve element being defined by its own cylindrical peripheral surface with a fourth diameter smaller than said given diameter and said third diameter, and the truncated cone.

6. The valve according to claim 1, wherein said valve element includes a first lower cylindrical peripheral surface having a first valve diameter and a second central cylindrical peripheral surface having a second valve diameter, said second valve diameter being less than said first valve diameter, and wherein said second central cylindrical peripheral surface is configured to be inserted inside said conduit of said valve housing.

\* \* \* \* \*